(12) United States Patent
Yamaguchi et al.

(10) Patent No.: US 7,243,703 B2
(45) Date of Patent: Jul. 17, 2007

(54) FLEXIBLE HEAT EXCHANGER

(75) Inventors: Kouji Yamaguchi, Kanagawa (JP); Ryoichi Sato, Kanagawa (JP); Hideki Ozawa, Chiba (JP)

(73) Assignee: Ube Industries, Ltd. (JP)

( * ) Notice: Subject to any disclaimer, the term of this patent is extended or adjusted under 35 U.S.C. 154(b) by 33 days.

(21) Appl. No.: 10/628,240

(22) Filed: Jul. 29, 2003

(65) Prior Publication Data

US 2004/0050532 A1    Mar. 18, 2004

(30) Foreign Application Priority Data

Jul. 29, 2002  (JP) .............................. 2002-219429

(51) Int. Cl.
*B60H 1/00*      (2006.01)
*F28F 3/12*      (2006.01)

(52) U.S. Cl. ..................... 165/41; 165/46; 165/168; 165/905; 29/890.039; 244/158.1

(58) Field of Classification Search .................. 165/46, 165/146, 170, 184, 41, 168, 905; 29/890.039; 428/35.2; 244/158.1
See application file for complete search history.

(56) References Cited

U.S. PATENT DOCUMENTS

| 4,260,695 | A | * | 4/1981 | Medem et al. ............... 525/466 |
| 4,449,992 | A | * | 5/1984 | Yamada et al. ................... 96/7 |
| 4,478,277 | A | * | 10/1984 | Friedman et al. ............ 165/185 |
| 5,245,693 | A | * | 9/1993 | Ford et al. .................... 392/470 |
| 5,262,227 | A | * | 11/1993 | Takabayashi et al. ........ 428/215 |
| 6,059,024 | A | * | 5/2000 | Ramshaw et al. ........... 165/166 |
| 6,191,945 | B1 | * | 2/2001 | Belady et al. ............... 361/704 |
| 6,480,257 | B2 | * | 11/2002 | Cassidy et al. .............. 392/470 |
| 2002/0132077 | A1 | * | 9/2002 | Ling et al. ................ 428/36.91 |
| 2003/0129379 | A1 | * | 7/2003 | Yao et al. ................. 428/308.4 |
| 2003/0213580 | A1 | * | 11/2003 | Philpott et al. ................ 165/46 |
| 2003/0230399 | A1 | * | 12/2003 | Hurlbert et al. ........ 165/104.25 |

* cited by examiner

*Primary Examiner*—Ljiljana Ciric
(74) *Attorney, Agent, or Firm*—Nixon Peabody LLP; Jeffrey L. Costellia

(57) ABSTRACT

The invention generally relates to a flexible heal exchanger comprising a pair of flexible multilayer thermoplastic polyimide films each of which comprises an aromatic polyimide substrate film showing no glass transition temperature or a glass transition temperature of 340° C. or higher and a thermoplastic aromatic polyimide surface film showing a glass transition temperature in the range of 190 to 300° C. in which the surface films of the flexible multilayer thermoplastic polyimide films face each other and are in part fused together, whereby producing between the flexible multilayer thermoplastic polyimide films a conduit pattern through which a fluid passes. The flexible multilayer thermoplastic polyimide films preferably have a thickness in the range of 10 to 125 μm and comprise a linear expansion coefficient of MD, a linear expansion coefficient of TD and an average of linear expansion coefficients of MD and TD, in the range of $10 \times 10^{-6}$ to $35 \times 10^{-6}$ cm/cm/° C. at 50-200° C.

5 Claims, 4 Drawing Sheets

FLEXIBLE HEAT EXCHANGER

FIELD OF THE INVENTION

The present invention relates to a flexible heat exchanger having a conduit pattern through which a fluid passes.

BACKGROUND OF THE INVENTION

AIAA-77-764 describes a flexible radiator for space vehicles which comprises a resinous or metallic pipe through which a refrigerant passes, a binder film binding the pipe, and a metal film.

Japanese Patent No. 3,084,814 describes a rigid radiator for space vehicles which comprises a conduit through which a refrigerant passes.

SUMMARY OF THE INVENTION

It is an object of the present invention to provide a flexible heat exchanger having a conduit pattern through which a fluid passes.

It is another object of the invention to provide a flexible heat exchanger having a simple structure.

The invention resides in a flexible heat exchanger comprising a pair of flexible thermoplastic polymer films which are in part fused together, whereby producing between the polymer films a conduit pattern through which a fluid passes.

DETAILED DESCRIPTION OF THE INVENTION

Preferred embodiments of the invention are described below:

(1) The flexible thermoplastic polymer films are flexible thermoplastic polyimide films.

(2) The flexible thermoplastic polymer films are composite films comprising a heat-resistant aromatic polyimide substrate film and a thermoplastic aromatic polyimide surface film fixed to the substrate film.

(3) The flexible thermoplastic polymer films are flexible thermoplastic polyethylene terephthalate films.

(4) The flexible heat exchanger has a heat conductive film on a surface thereof.

(5) In the flexible heat exchanger, a flexible film having a heat radiant metal layer on one side is fixed to the heat conductive film.

(6) The flexible heat exchanger has a heat resistant porous film on a surface having no heat conductive film thereon.

(7) The flexible heat exchanger has a thickness of 25 μm to 20 mm, preferably 25 to 200 μm.

(8) The flexible heat exchangers are placed one on another to produce a multi-layered flexible heat exchanger.

Figure 4:
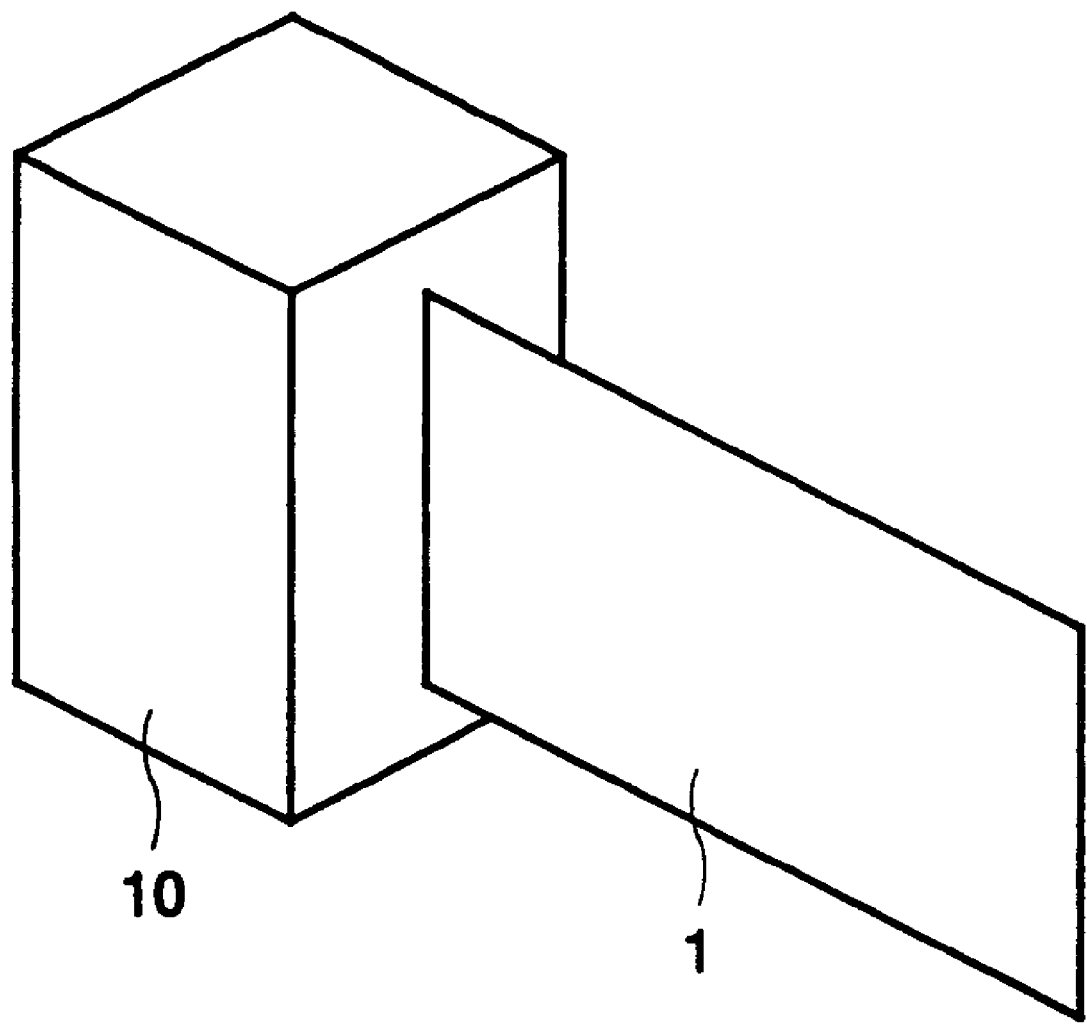
FIG. 4 illustrates a structure in which a flexible heat exchange of the invention is attached to a space vehicle.

(9) A space vehicle having the flexible heat exchanger (used as a heat radiator) on a surface thereof. See FIG. 4 in which the flexible heat exchanger 1 of the invention is attached to a space vehicle 10.

(10) An electronic apparatus such as a personal computer having the flexible heat exchanger on a surface thereof.

(11) An electronic part such as a flexible circuit board having the flexible heat exchanger on a surface thereof.

(12) A solar heat collector having the flexible heat exchanger on a surface thereof.

The present invention is further described below by referring to the attached drawings.

The flexible heat exchanger of the invention comprises a pair of flexible thermoplastic polymer films which are in part fused together, whereby producing between the polymer films a conduit pattern through which a fluid passes.

The pair of flexible thermoplastic polymer films produce in combination a structure in which a conduit pattern is formed.

The flexible thermoplastic polymer films, namely, cover films, can be polyimide films, polyester films (e.g., polyethylene terephthalate films), polyamide films, ethylene polymer films, or elastomer films. The polyimide films and polyethylene terephthalate films are preferred.

The flexible thermoplastic polymer film preferably has a thickness of 10 to 125 μm and a glass transition temperature (or a melting point or a softening point) of 190 to 300° C. The flexible thermoplastic polymer film may contain an inorganic filler or other additives for increasing heat conductivity of the polymer film.

The flexible thermoplastic polyimide film can be a single layer film or a multilayer film comprising a high heat resistant polyimide substrate film and a thermoplastic polyimide surface film. The multilayer polyimide film preferably comprises a heat resistant substrate film of 5 to 120 μm thick, more preferably 5 to 75 μm thick and a thermoplastic surface film of 2 to 10 μm thick.

The multilayer polyimide film can be prepared by the steps of combining a solution film of a polyimide precursor solution (i.e., polyamic acid solution) for the high heat resistant polyimide substrate and a solution film of a polyimide precursor solution (i.e., polyamic acid solution) for the thermoplastic polyimide surface film, and heating the combined solution films to convert them the multilayer polyimide film. Detailed process is as follows. A dope solution I (polyamic acid solution for the high heat resistant polyimide substrate) and a dope solution II (polyamic acid solution for the thermoplastic polyimide surface film) were placed in a multi-manifold type molding die for three film extrusion. A combination of the dope solution II, the dope solution I, and the dope solution II was simultaneously extruded from the die and casted on a stainless steel belt support. The casted solution films were dried by continuously applying an air heated to 100-200° C., to give a solid film. The solid film was separated from the support and placed in a heating furnace to gradually heating the solid film from 300° C. to 400° C. Thus, the solvent was removed and the film was imidized to give a polyimide film.

The thermoplastic polyimide film can be produced from aromatic tetracarboxylic acid compounds comprising 2,3,3',4'-biphenyltetracarboxylic dianhydride (a-BPDA) and 4,4'-oxydiphthalic dianhydride and diamine compounds such as 1,3-bis(4-aminophenoxybenzene) (TPE-R) or 1,3-bis(3-aminophenoxybenzene) by polymerization and imidization.

The high heat resistant polyimide substrate film preferably has no glass transition temperature or a glass transition temperature (Tg) of approx. 340° C. or higher and can be produced from aromatic tetracarboxylic acid compounds such as 3,3',4,4'-biphenyltetracarboxylic dianhydride (s-BPDA) or pyromellitic dianhydride and diamine compounds such as p-phenylenediamine (PPD) or a combination of PPD and 4,4'-diaminophenyl ether, by polymerization and imidization.

The above-mentioned multilayer polyimide film preferably has a linear expansion coefficient (Machine Direction (MD), Traverse Direction (TD) and their average, at 50-200° C.) of $10\times10^{-6}$ to $35\times10^{-6}$ cm/cm/° C.

The flexible heat exchanger of the invention can be manufactured in principle by a method comprising the steps of placing one flexible thermoplastic polymer film on another flexible thermoplastic polymer film and fusing both polymer films in part to combine both polymer films together in part to form the conduit pattern between the polymer films.

The flexible heat exchanger of the invention is preferably manufactured by a method comprising the steps of placing one flexible thermoplastic polymer film on another flexible thermoplastic polymer film via an intervening flexible thermoplastic polymer film from which a conduit patter is already cut out, and fusing both polymer films on the intervening flexible thermoplastic polymer film to combine both polymer films together in part to form the conduit pattern between the polymer films.

Figure 1:
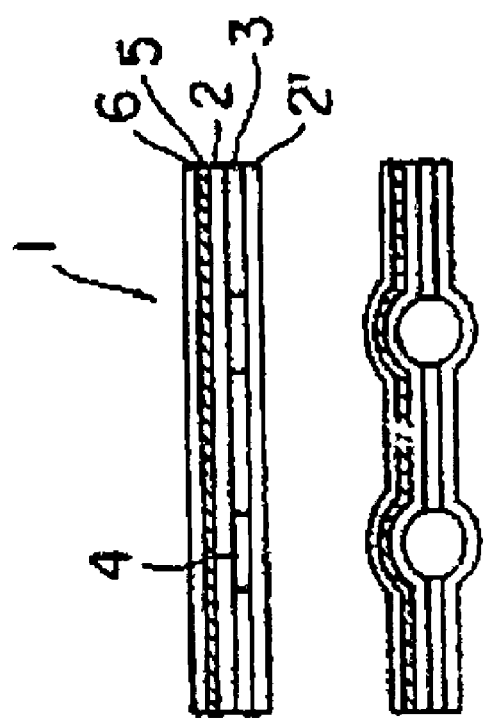
FIG. 1 illustrates views indicating an example of a flexible heat exchanger of the invention and one method for manufacturing the flexible heat exchanger.
Figure 1:
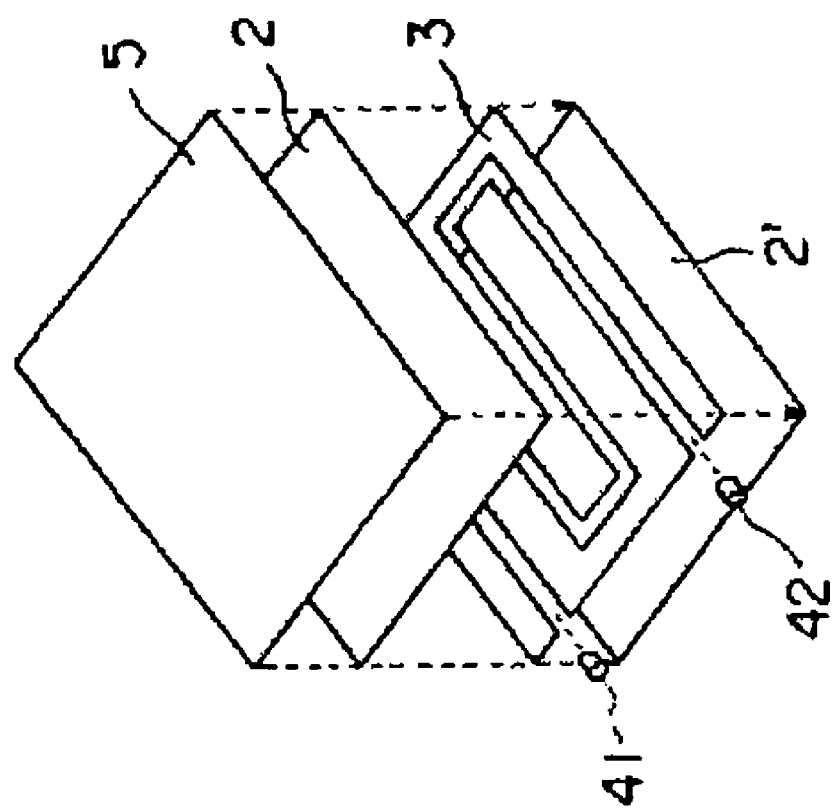

The above-mentioned method is explained referring to FIG. 1 of the attached drawings.

In FIG. 1, an intervening flexible thermoplastic polymer film 3 having a reverse pattern of a predetermined conduit pattern is placed between a pair of flexible thermoplastic polymer films (i.e. cover films) 2, 2'. On one cover film 2 is placed a heat conductive sheet 5. The multilayer structure of the heat conductive sheet 5, cover film 2, intervening film 3, and cover film 2' is heated under pressure. Thus, a composite structure is produced. In the structure, the cover film 2 and cover film 2' are firmly fused together via the intervening film 3 which produces a conduit pattern between the cover films. To the cover film 2 is fixed the heat conductive sheet. Then, a flexible film 6 having a heat radiant metal layer on one side is fixed to the heat conductive sheet 5. Subsequently, a fluid (gas or liquid such as ammonium gas, water, FLORINATE (fluorinated liquid) available from 3M Corporation is introduced under pressure into the conduit pattern so as to produce the desired conduit, as is illustrated in FIG. 1. Thereafter, a set of an inlet tube 41 and an outlet tube 42 are fixed to the inlet and outlet of the conduit. Thus, the desired flexible heat exchanger 1 of the invention is manufactured.

Figure 2:
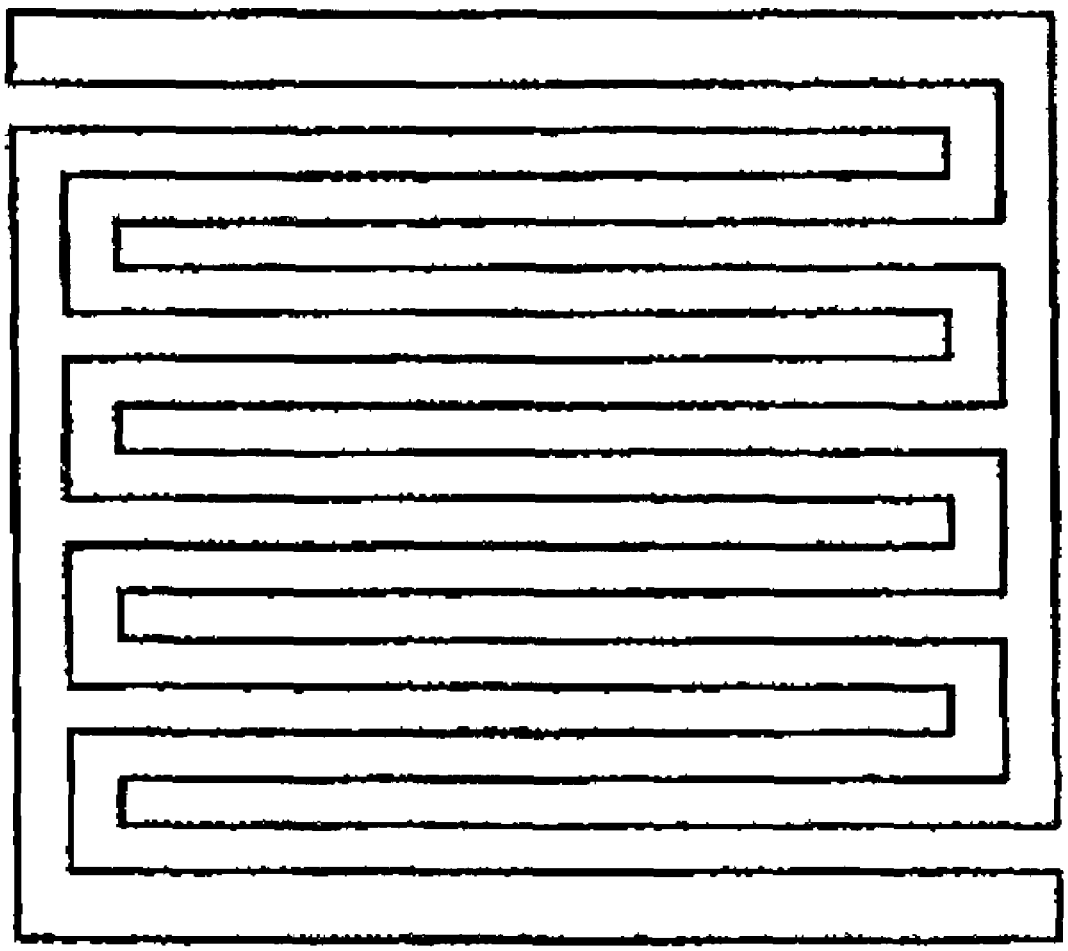
FIG. 2 illustrates a set of flexible thermoplastic intervening films for forming a conduit pattern in combination which are placed between a pair of flexible thermoplastic cover films.

FIG. 2 illustrates an example of the thermoplastic intervening film having a reverse pattern of a conduit pattern.

In the above-mentioned manufacturing method, it is preferred that the heat conductive sheet (or film) has a heat conductivity of 350 W/mk or higher and a thickness of 10 µm to 2 mm. An example of the heat conductive sheet is PGS GRAPHITE SHEET (graphite sheet) available from Matsushita Electronic Parts Co., Ltd.

An example of the flexible films having a heat radiant metal layer on one side is a polymer film having a vacuum deposited metal layer. The metal layer preferably comprises gold, aluminum, or silver. There can be mentioned a silver-deposited FEP film, a silver-deposited PTFE film, an aluminum-deposited polyimide film, and a silver-deposited polyether-imide film. These metal-deposited films can have an electroconductive or oxide film such as ITO film, $SiO_x$ film, alumina film, or germanium film on the metal layer.

The flexible heat exchanger manufactured above may have a heat resistant porous film on a surface having no heat conductive film thereon. The heat resistant porous film may be a porous resin film such as a porous polyimide film having a thickness of 5 µm to 10 mm. To the heat conductive porous film may be fixed a heat resistant polyimide film.

The heat conductive film, flexible films having a heat radiant metal layer, heat resistant porous film, and heat resistant polyimide film can be fixed to the flexible heat exchanger by an a heat resistant adhesive such as polyimide adhesive. However, an acrylic tacky adhesive or a silicon adhesive may be used, depending on the desired used of the heat exchanger.

Otherwise, the flexible heat exchanger of the invention can be manufactured by any of the following methods.

Figure 3:
FIG. 3 illustrates a copper foil in the form of a conduit pattern for forming a conduit which are placed between a pair of flexible thermoplastic cover films.

(1) A method comprising the steps of placing one flexible thermoplastic polymer film on another flexible thermoplastic polymer film via a copper foil having a conduit pattern, fusing both polymer films to combine both polymer films together in part, and etching out the copper foil to form the conduit pattern between the polymer films. This method is described in more detail in the below-mentioned Examples 2 and 3. In FIG. 3, an example of the copper foil having a conduit pattern is illustrated.

(2) A method comprising the steps of placing one flexible thermoplastic polymer film on another flexible thermoplastic polymer film, heating both polymer films in a conduit pattern by applying heat to both polymer films via a heat insulating material in the conduit pattern, and fusing both polymer films to combine both polymer films together in part to form the conduit pattern between the polymer films. This method is described in more detail in the below-mentioned Example 1.

(3) A method of manufacturing the flexible heat exchanger of claim 1 which comprises the steps of placing one flexible thermoplastic polymer film on another flexible thermoplastic polymer film, heating both polymer films in a conduit pattern by applying heat to both polymer films by means of a thermal head in a reverse pattern of the conduit pattern, and fusing both polymer films on the intervening flexible thermoplastic polymer film to combine both polymer films together in an area other than the conduit pattern to form the conduit pattern between the polymer films.

(4) A method comprising the steps of placing one flexible thermoplastic polymer film on another flexible thermoplastic polymer film via a heat-insulating film in a conduit pattern, fusing both polymer films to combine both polymer films together in an area other than the conduit pattern part, and removing the heat-insulating film to form the conduit pattern between the polymer films.

The present invention is further described by the following examples.

[Preparation of Flexible Thermoplastic Polyimide Film I]

A polyamic acid solution (for heat resistant substrate film) prepared from a combination of s-BPDA and PPD and a polyamic acid solution (for thermoplastic surface film) prepared from a combination of a-BPDA and TPE-R were simultaneously extruded from a multi-slit die to prepare a three-layered polyimide film comprising two surface films and one substrate film. The physical characteristics of the three-layered polyimide film are set forth below:

| | |
|---|---|
| total thickness: | 25 μm |
| Tg of the surface layer: | 255° C. |
| thermal linear expansion (50-200° C.): | 19 × 10<sup>−6</sup> cm/cm/° C. |

[Preparation of Flexible Thermoplastic Polyimide Film II]

The procedure for preparing the flexible thermoplastic film I was repeated except for employing a polyamic acid solution (for thermoplastic surface film) prepared from a combination of a-BPDA(20 mol %)+s-BPDA(80 mol %) and TPE-R to prepare a three-layered polyimide film comprising two surface films and one substrate film. The physical characteristics of the three-layered polyimide film are set forth below:

| | |
|---|---|
| total thickness: | 25 μm |
| Tg of the surface layer: | 261° C. |
| thermal linear expansion (50-200° C.): | 19 × 10<sup>−6</sup> cm/cm/° C. |

EXAMPLE 1

The following elements were placed in order:

Stainless steel sheet (SUS, 200 mm×200 mm×1.5 mm)-UPILEX S (releasing polyimide film) available from Ube Industries. Ltd., 200 mm×200 mm×25 μm)-silicone rubber sheet (150 mm×150 mm×1 mm)-polyimide films (UPILEX S, 200 mm×200 mm×25 μm)-two flexible thermoplastic polyimide films I (100 mm×100 mm×25 μm)-a set of heat insulating sheets forming a reverse pattern of a conduit pattern (see FIG. 2, made of TECHNOLA FELT (aromatic polyamide non-woven cloth, 210 g/m$^2$) available from Teijin Corporation)-releasing polyimide film (UPILEX S, 200 mm×200 mm×25 μm)-stainless steel sheet (SUS, 200 mm×200 mm×1.5 μm).

Thus formed laminate was placed in a single-acting compression press (available from Sindo Metal Industries, Co., Ltd.) equipped with a upper heater heated to 320° C. and a lower heater heated to 90° C. The laminate was then pressed at a pressure of 5 MPa for one minute to give a heat exchanger of the invention (thickness: 50 μm) having a conduit pattern. It was confirmed that water passed through the conduit of the heat exchanger, and the heat exchanger can be rolled to give a roll having a diameter of 10 mm.

EXAMPLE 2

Stainless steel sheet (SUS, 200 mm×200 mm×1.5 mm)-releasing polyimide film (UPILEX S, 200 mm×200 mm×25 μm)-silicone rubber sheet (150 mm×150 mm×1 mm)-polyimide film, UPILEX S, 200 mm×200 mm×25 μm)-flexible thermoplastic polyimide film I (100 mm×100 mm×25 μm)-copper foil having a conduit pattern (see FIG. 3, USLPR2-9, available from Japan Electrolysis Co., Ltd. thickness: 9 μm)-flexible thermoplastic polyimide film I (100 mm×100 mm×25 μm)-releasing polyimide film (UPILEX S, 200 mm×200 mm×25 μm)-stainless steel sheet (SUS, 200 mm×200 mm×1.5 mm).

Thus formed laminate was placed in a vacuum press (KVHC-PRESS, available from Kitagawa Precision Machine, Co., Ltd.). The laminate was then pressed at a pressure of 5 MPa at room temperature, heated to 340° C. for 40 minutes, and placed for 3 minutes. Subsequently, the laminate was cooled at room temperature for 50 minutes.

Into the copper foil layer was introduced a ferrous chloride-etching solution to dissolve the copper foil. The space formed by the dissolution of copper foil was washed with 3% aqueous hydrochloric acid and water, to completely removing the etched copper foil, to give a heat exchanger of the invention (thickness: 50 μm) having a conduit pattern. It was confirmed that water passed through the conduit of the heat exchanger, and the heat exchanger can be rolled to give a roll having a diameter of 10 mm.

EXAMPLE 3

The procedures of Example 2 were repeated except that the flexible thermoplastic polyimide films I were replaced with the flexible thermoplastic polyimide films II to give a heat exchanger of the invention (thickness: 50 μm) having a conduit pattern. It was confirmed that water passed through the conduit of the heat exchanger, and the heat exchanger can be rolled to give a roll having a diameter of 10 mm.

What is claimed is:

1. A flexible heat exchanger comprising a pair of flexible multilayer thermoplastic polyimide films each of which comprises an aromatic polyimide substrate film showing no glass transition temperature or a glass transition temperature of 340° C. or higher and a thermoplastic aromatic polyimide surface film showing a glass transition temperature in the range of 190 to 300° C. in which the surface films of the flexible multilayer thermoplastic polyimide films face each other and are in part fused together, whereby producing between the flexible multilayer thermoplastic polyimide films a conduit pattern through which a fluid passes, wherein said flexible multilayer thermoplastic polyimide films have a thickness in the range of 10 to 125 μm and comprises a linear expansion coefficient of MD, a linear expansion coefficient of TD and an average of linear expansion coefficients of MD and TD, in the range of 10×10$^{-6}$ to 35×10$^{-6}$ cm/cm/° C. at 50-200° C.

2. The flexible heat exchanger of claim 1, further comprising a heat conductive film on a surface thereof.

3. The flexible heat exchanger of claim 2, wherein a flexible film having a heat radiant metal layer on one side is fixed to the heat conductive film.

4. The flexible heat exchanger of claim 3, which has a heat resistant porous film on a surface having no heat conductive film thereon.

5. A space vehicle having the flexible heat exchanger of claim 1 on a surface thereof, in which the flexible heat exchanger comprises a pair of flexible multilayer thermoplastic polyimide films each of which comprises an aromatic polyimide substrate film showing no glass transition temperature or a glass transition temperature of 340° C. or higher and a thermoplastic aromatic polyimide surface film showing a glass transition temperature in the range of 190 to 300° C. in which the surface films of the flexible multilayer thermoplastic polyimide films face each other and are in part fused together, whereby producing between the flexible multilayer thermoplastic polyimide films a conduit pattern through which a fluid passes, wherein said flexible multilayer thermoplastic polyimide films have a thickness in the range of 10 to 125 μm and comprises a linear expansion coefficient of MD, a linear expansion coefficient of TD and an average of linear expansion coefficients of MD and TD, in the range of 10×10$^{-6}$ to 35×10$^{-6}$ cm/cm/° C. at 50-200° C.

* * * * *